May 19, 1925.
C. H. TAYLOR
PISTON RING
Filed Sept. 17, 1924
1,538,758
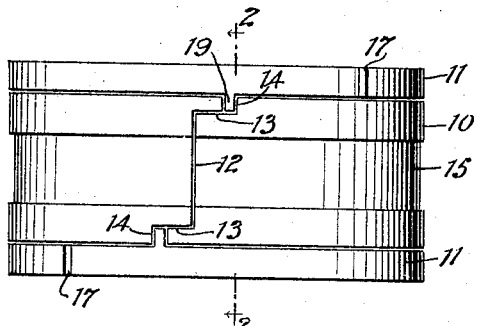
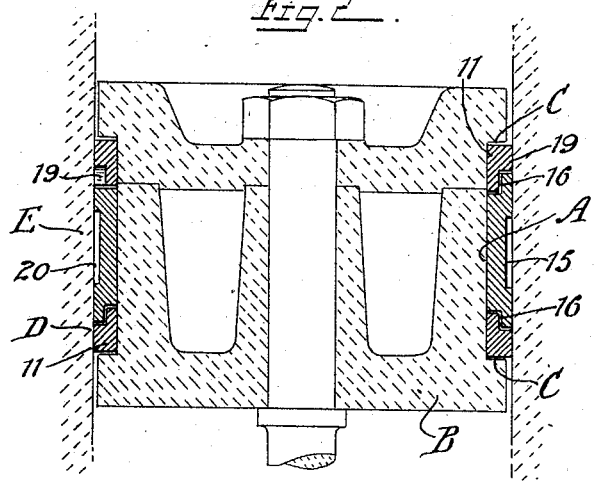
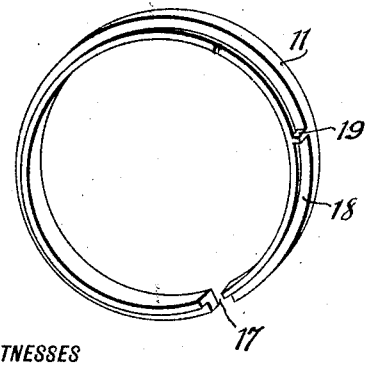
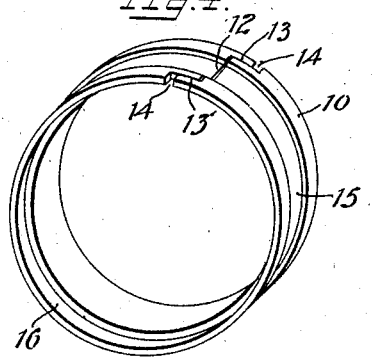
WITNESSES
H. T. Walker
Hugh H. Ott
INVENTOR
Claude H. Taylor
BY
ATTORNEYS Patented May 19, 1925.

1,538,758

UNITED STATES PATENT OFFICE.

CLAUDE HUNTER TAYLOR, OF BILOXI, MISSISSIPPI.

PISTON RING.

Application filed September 17, 1924. Serial No. 738,231.

*To all whom it may concern:*

Be it known that I, CLAUDE H. TAYLOR, a citizen of the United States of America, and resident of Biloxi, in the county of Harrison and State of Mississippi, have invented a new and Improved Piston Ring, of which the following is a full, clear, and exact description.

This invention relates to piston or packing rings and has particular reference to an improved ring for use in connection with steam or other fluid pump pistons or plungers.

The outstanding object of the present invention is to provide an improved piston ring which affords a double seal on both the cylinder walls and the follower plates.

A further object of the invention comprehends a balanced piston ring by means of which undue pressure on the cylinder walls is eliminated, thereby effecting an economy in fuel and an increase in power in addition to increasing the length of life of the cylinder bore and the ring surfaces for minimizing wear thereon.

As a still further object the invention contemplates a piston ring which includes a plurality of split ring sections and in which means is provided for preventing relative rotation of the rings and consequently the registry of the split portions, to positively preclude leakage from this source.

The invention furthermore contemplates an improved piston ring which is comparatively simple in its construction, inexpensive to manufacture and produce, which is thoroughly reliable and highly efficient in its purpose and which is readily applicable to or removable from a piston or plunger.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a side view of a piston ring constructed in accordance with the invention;

Fig. 2 is a sectional view illustrating the same in its applied position;

Fig. 3 is a perspective view of one of the ring elements;

Fig. 4 is a similar view of the other ring element.

Referring to the drawings by characters of reference 10 designates the intermediate ring element or section and 11—11 the outer ring elements or sections all of which combine to make up the complete piston or packing ring. The intermediate section is transversely split as at 12 for the major portion of its width and is provided with circumferentially offset split portions 13 extending in opposite directions, the free ends of the transversely offset split portions communicating with the recesses 14 in the opposite edges of the intermediate section. The intermediate section is further provided with a circumferential or annular groove 15 in its outer periphery for a purpose to be hereafter set forth. The opposite edges of the inner periphery or corners are rabbeted as at 16. The outer ring sections 11 which are of identical construction are transversely split throughout their width as at 17 and are provided with circumferentially rabbeted inner corners 18 which rabbeted corners are provided with a locking key or lug 19, intersecting the rabbet.

In the application of the invention as illustrated in Fig. 2 the ring with the assembled sections as illustrated are positioned in the groove A of the piston or plunger B which is defined between the follower plates or beads C. It will be noted that the rabbeted portion 19 of the outer rings 11 and the rabbeted portion 16 of the intermediate ring section interengage and that the retaining keys or lugs 19 are received by the recesses 14 so that the ring sections are prevented from relatively rotating, thereby preventing accidental registry of the split portion 17 with the split portions 12 of the intermediate ring. When in appplied position the groove 15 defines together with the bore or inner wall D of the cylinder E an annular receiving space 20 for the steam or other fluid in the cylinder. It thus follows that the pressure which finds its way into the receiving space 20 is equalized on both sides of the intermediate ring so that the outer faces of the ring sections 10 and 11 engage with the bore or inner wall D of the cylinder only by the inherent expansive action of the material from which the rings are formed. It will also be obvious that a double seal is provided both on the cylinder walls and the follower plates or beads C thus effectually preventing leakage around the piston or plunger B.

I claim:

1. A piston ring comprising an intermediate split ring section and outer split ring sections, the intermediate section having an outer peripheral groove defining together with the cylinder wall a pressure receiving space for partially equalizing the fluid pressure on the opposite sides of the ring, whereby a pressure only slightly in excess of the inherent expansive action of the material from which the ring is formed, is exerted against the cylinder wall and interengageable means on the intermediate and outer sections of the ring for causing said outer sections to contract with the intermediate section for relieving the same of the greater part of the fluid pressure on the inner side, said means comprising complementary rabbeted portions on the confronting edges of the ring sections and interengageable means on the intermediate and outer sections for preventing relative rotation thereof, said means comprising a key or lug intersecting the rabbeted portion of each outer section and a recess in the opposite confronting edges of the intermediate section.

2. A piston ring including an intermediate section and a pair of outer sections, the intermediate section consisting of an annular member having an outer peripheral groove, transversely split for the major portion of its width, circumferential slits communicating therewith and extending in opposite directions, the opposite outer edges of said intermediate section having recesses in its opposite edges communicating with the free ends of the slits, the said outer ring sections being transversely split and provided with circumferentially spaced keys engageable in the recesses of the intermediate portions, and the confronting edges of the intermediate and outer sections having interengageable rabbeted portions.

3. A piston ring including intermediate and outer transversely split ring sections, the opposite ends of the former adjacent its opposite edges being recessed transversely in opposite directions and lugs of lesser length than the recesses projecting from the opposing ends into the recesses to define between the ends of the recesses and said lugs notches which are transversely spaced with respect to each other, and keys formed on the confronting inner edges of the outer sections engageable in the notches for retaining the ring sections against relative circumferential movement.

CLAUDE HUNTER TAYLOR.